US006704325B1

(12) United States Patent
Lowe et al.

(10) Patent No.: US 6,704,325 B1
(45) Date of Patent: Mar. 9, 2004

(54) METHOD TO RECOGNIZE STREAMING MEMORY ALIGNED AND NON-MEMORY ALIGNED DATA PATTERNS WITH OPTIMAL HARDWARE REUSE

(75) Inventors: Glen H. Lowe, Union City, CA (US); Claude Hayek, Huntington Beach, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/287,229

(22) Filed: Apr. 6, 1999

(51) Int. Cl.[7] ............................. H04J 3/16; G06F 1/32
(52) U.S. Cl. ..................... 370/465; 370/476; 370/510; 713/310
(58) Field of Search ................................ 709/217, 229, 709/222, 225, 231, 250; 370/464, 465, 476, 498, 503, 510, 511, 512, 513, 470, 471, 463; 713/320, 300, 310

(56) References Cited

U.S. PATENT DOCUMENTS

| 5,661,763 A | * | 8/1997 | Sands ........................ 375/342 |
| 5,982,786 A | * | 11/1999 | Grivna ....................... 370/503 |
| 6,094,443 A | * | 7/2000 | Dwork ....................... 370/510 |
| 6,098,100 A | * | 8/2000 | Wey et al. ................ 340/825.5 |
| 6,292,831 B1 | * | 9/2001 | Cheng ........................ 709/224 |

OTHER PUBLICATIONS

"Magic Packet Technology". AMD. Nov. 1995.*

* cited by examiner

*Primary Examiner*—Chi Pham
*Assistant Examiner*—Derrick W. Ferris

(57) ABSTRACT

A method and system for efficiently handling a particular streaming data packet regardless of whether the streaming data packet has a first alignment or a second alignment. In one embodiment, the present invention receives a first portion of an incoming packet stream at a peripheral component adapted to be coupled to a host computer. The present embodiment then receives a second portion of the incoming packet stream at the peripheral component. Next, the present embodiment determines whether the incoming packet stream has a first alignment or a second alignment. Provided that the incoming packet stream has the second alignment, the present embodiment reconfigures the incoming packet stream to have the first alignment. The present embodiment then handles the incoming packet stream using a single processing unit adapted to handle only packet streams having the first alignment. In so doing, the present invention is able to handle an incoming packet stream having either a first alignment or a second alignment without requiring multiple processing units.

24 Claims, 7 Drawing Sheets

METHOD TO RECOGNIZE STREAMING MEMORY ALIGNED AND NON-MEMORY ALIGNED DATA PATTERNS WITH OPTIMAL HARDWARE REUSE

TECHNICAL FIELD

The present invention generally pertains to the field of computer networking. More particularly, the present invention is related to the ability of a peripheral component to access and storing data into cache memory of a host computer device.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

The NIC, like other peripheral component devices, requires a device driver which controls the physical functions of the NIC and coordinates data transfers between the NIC and the host operating system. An industry standard for interfacing between the device driver and the host operating system is known as the Network Device Interface Specification, or NDIS, which is developed by Microsoft® Corporation of Redmond, Wash. The operating system layer implementing the NDIS interface is generally known as an NDIS wrapper. Functionally, the NDIS wrapper arbitrates the control of the device driver between various application programs and provides temporary storage for the data packets.

In the networking industry, a standard has been developed for allowing a networked personal computer (PC) which is in sleep mode to be awakened. More specifically, Advanced Micro Devices® (AMD) of Santa Clara, Calif. has developed a technology referred to as the MAGIC PACKET® technology. In the Magic Packet technology, assuming, for example, that an Ethernet controller is running and communicating with the network, the PC's power management hardware or software puts the Ethernet controller into the MAGIC PACKET® mode prior to the system going to sleep. Once in the sleep, the PC will be awakened when a MAGIC PACKET® is detected. That is, incoming data will be monitored until the specific sequence comprising the MAGIC PACKET® is detected. A MAGIC PACKET® consists of 16 duplications of the IEEE (Institute of Electrical and Electronics Engineers) address of the destination node, with no breaks or interruptions. The MAGIC PACKET® can be located anywhere within incoming packets, but must be preceded by a synchronization stream. The synchronization stream allows the scanning state machine to be much simpler. The synchronization stream is defined as at least 6 bytes of FFh (i.e. a byte of all 1's; and wherein h stands for hexadecimal). The device will also accept a multicast frame, as long as the 16 duplications of the IEEE address match the address of the machine to be awakened.

As an example, if the IEEE address for a particular node on the network was 11*h* 22*h* 33*h* 44*h* 55*h* 66*h*, then the LAN controller would be scanning for the data sequence (assuming an Ethernet Frame):

DESTINATION SOURCE MISC FF FF FF FF FF
FF 11 22 33 44 55 66 11 22 33 44 55 66 11 22 33 44
55 66 11 22 33 44 55 66 11 22 33 44 55 66 11 22 33
44 55 66 11 22 33 44 55 66 11 22 33 44 55 66 11 22
33 44 55 66 11 22 33 44 55 66 11 22 33 44 55 66 11
22 33 44 55 66 11 22 33 44 55 66 11 22 33 44 55 66
11 22 33 44 55 66 11 22 33 44 55 66 MISC CRC

Unfortunately, detection of a MAGIC PACKET® is complicated in a 16-bit wide bus environment. Specifically, in such an environment, there is no way to determine whether the MAGIC PACKET® data pattern will start aligned on a 16-bit boundary or on an 8-bit boundary. That is, in order to accurately and efficiently utilize MAGIC PACKET® technology in a 16-bit bus environment, it is necessary to know whether the streaming data packet (i.e. the MAGIC PACKET®) has a first alignment (e.g. the MAGIC PACKET® has an even-alignment), or whether the streaming data packet has a second alignment (e.g. the MAGIC PACKET® has an odd-alignment).

One approach to solve the above described problem is to employ two processing units. The first processing unit would be configured to handle a streaming data packet having the aforementioned first alignment. Conversely, the second processing unit would be configured to handle a streaming data packet having the aforementioned second alignment. Such a coarse solution is not practical, however. Using two processing units is wasteful and increases system cost. Furthermore, such an approach is typically unable to detect when the MAGIC PACKET® starts with more than 6 FFh.

Thus, a need exists for a system and method which efficiently handles a particular streaming data packet regardless of whether the streaming data packet has a first alignment or a second alignment. A further need exists for a system and method meets the above-listed need and wherein the method and system is able to handle the streaming data packet using only a single processing unit regardless of whether the streaming data packet has a first alignment or a second alignment.

DISCLOSURE OF THE INVENTION

The present invention provides a system and method which efficiently handles a particular streaming data packet regardless of whether the streaming data packet has a first alignment or a second alignment. The present invention further provides a system and method achieves the above-listed accomplishment and wherein the method and system is able to handle the streaming data packet using only a single processing unit regardless of whether the streaming data packet has a first alignment or a second alignment.

Specifically, in one embodiment of the present invention, the present invention receives a first portion of an incoming packet stream at a peripheral component adapted to be coupled to a host computer. The present embodiment then receives a second portion of the incoming packet stream at the peripheral component. Next, the present embodiment determines whether the incoming packet stream has a first alignment or a second alignment. Provided that the incoming packet stream has the second alignment, the present embodiment reconfigures the incoming packet stream to have the first alignment. The present embodiment then handles the incoming packet stream using a single processing unit adapted to handle only packet streams having the first alignment. In so doing, the present invention is able to handle an incoming packet stream having either a first alignment or a second alignment without requiring multiple processing units.

In another embodiment, the present invention includes the features of the above-described embodiment and includes additional recitation. Specifically, the present embodiment recites that the first portion of the incoming packet stream is a first 16 bit word thereof, and that the second portion of the incoming packet stream is a second 16 bit word thereof. In this embodiment, the present invention determines whether the incoming packet stream has a first alignment or a second alignment by combining a first byte of the second 16 bit word with a second byte of the first 16 bit word to form a new 16 bit word. In the new 16 bit word, the first byte of the new 16 bit word is the second byte of the first 16 bit word. Additionally, the second byte of the new 16 bit word is the first byte of the second 16 bit word. Next, provided the new 16 bit word is FFFFh, the present embodiment assumes that the incoming packet stream has an odd-alignment. However, provided that the new 16 bit word is not FFFFh, and provided that the second 16 bit word is FFFFh, the present embodiment assumes that the packet stream has an even-alignment.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
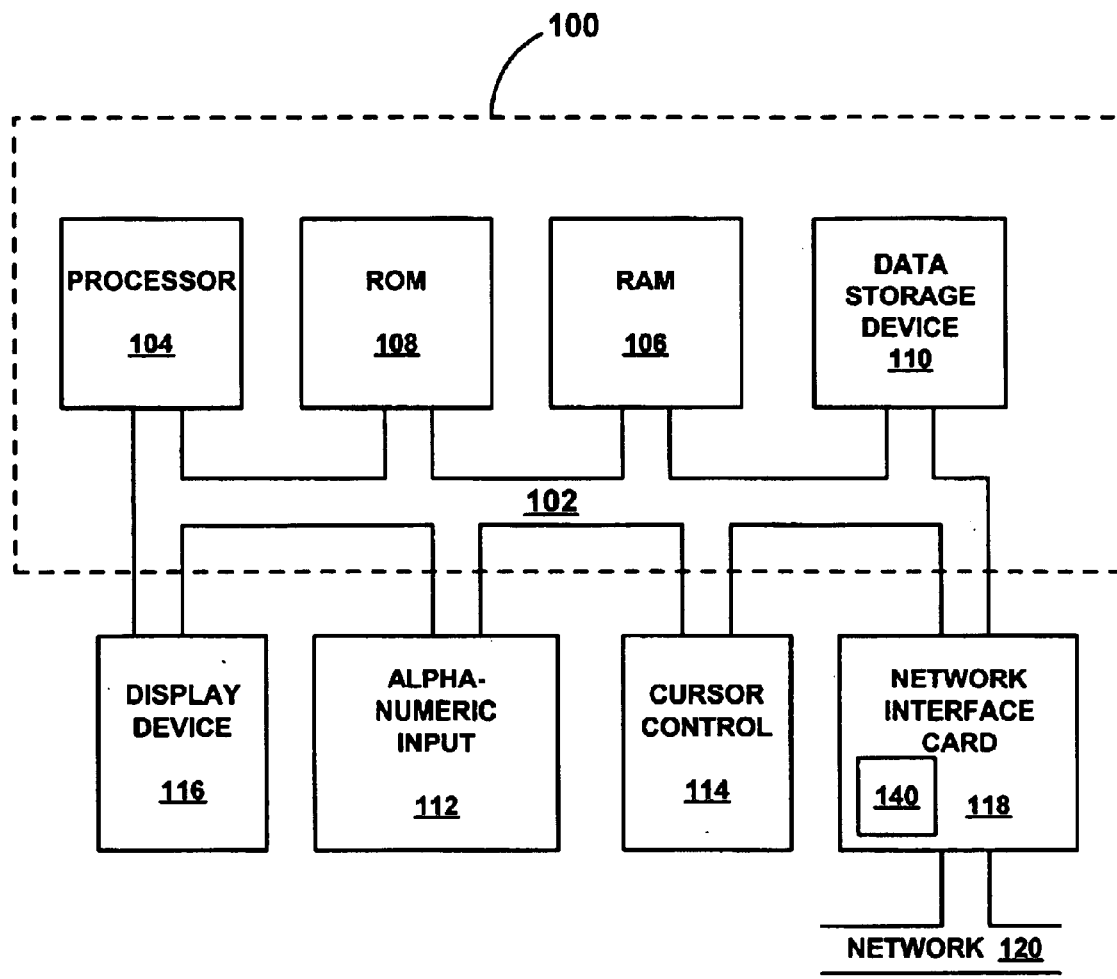
FIG. 1 is a schematic diagram of an exemplary computer system used to perform steps of the present method in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "determining", "comparing", "combining", "handling" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

With reference now to FIG. 1, portions of the present method and system are comprised of computer-readable and computer-executable instructions which reside, for example, in computer-usable media of a computer system. FIG. 1 illustrates an exemplary computer system 100. The computer system 100 is used in combination with a peripheral component to perform the present method in accordance with one embodiment of the present invention. It is appreciated that system 100 of FIG. 1 is exemplary only and that the present invention can operate within a number of different computer systems including general purpose networked computer systems, embedded computer systems, and stand alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

Figure 2:
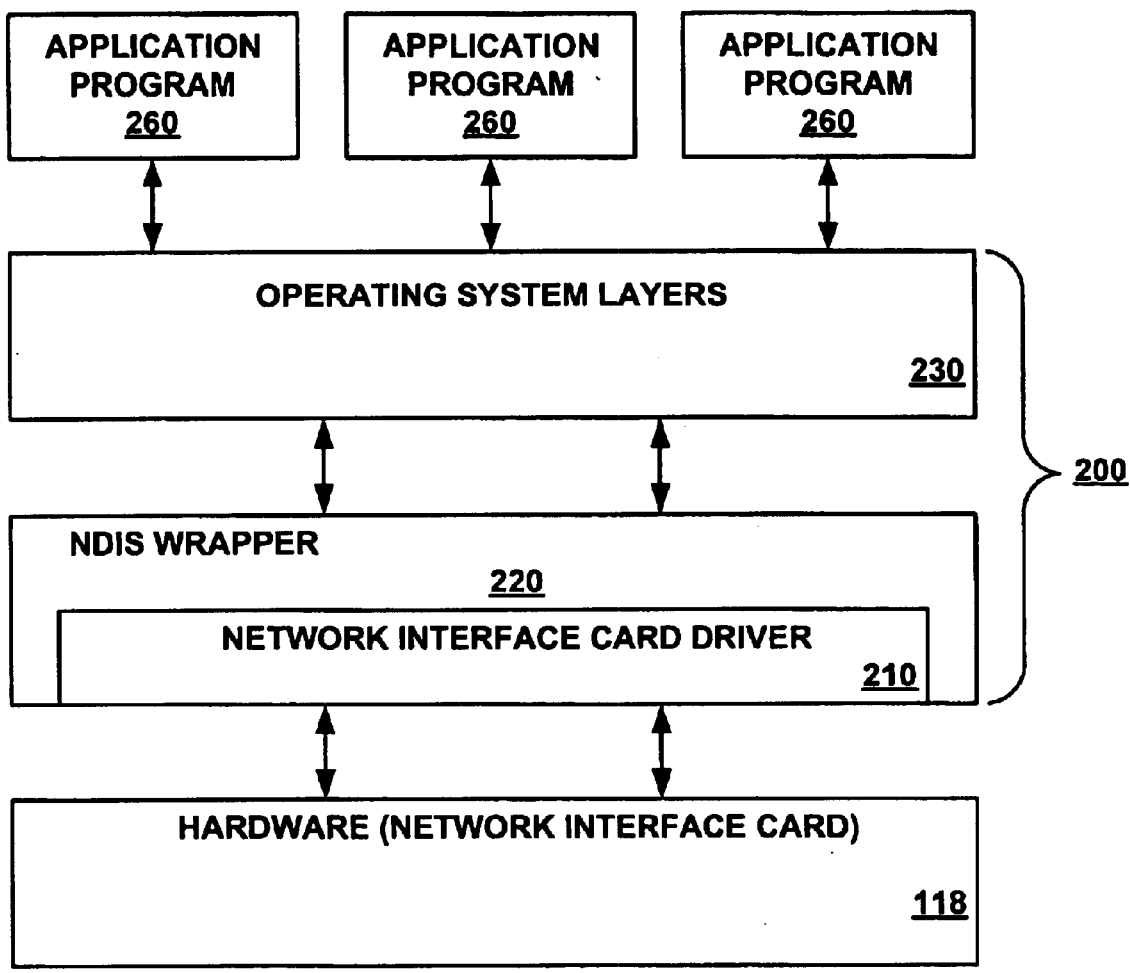
FIG. 2 is a schematic diagram of different operating layers associated with the computer system as illustrated in FIG. 1 in furtherance of one embodiment of the present invention.

Furthermore, in the following discussion, a computer system such as computer system 100 of FIG. 2 is described for purposes of clarity. However, in embodiments of the present invention, portions of the present method and system are comprised of computer-readable and computer-executable instructions which are performed by NIC 118 shown coupled to computer system 100. That is, in the present embodiment, many steps of the present invention are not performed by the processor of the host computer, but are instead performed by, for example, a NIC ASIC (application specific integrated circuit) 140, residing on NIC 118.

System 100 of FIG. 1 includes an address/data bus 102 for communicating information, and a central processor unit 104 coupled to bus 102 for processing information and instructions. Central processor unit 104 may be an 80×86-family microprocessor. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. System 100 of the present invention also includes an optional alphanumeric input device 112 including alphanumeric and function keys. Alphanumeric input device 112 is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

With reference still to FIG. 1, significantly, a network interface card (NIC) 118 coupled to bus 102 is connected to a network 120 and controls the flow of information to and from NIC 118 over network 120. Data packets, such as Ethernet packets, that are incoming arrive at NIC 118 via network 120 and are typically stored in memory of NIC 118 before being transferred to other hardware and software of computer system 100. A more detailed discussion of NIC 118 in furtherance of the present invention is found below.

Referring next to FIG. 2, a block diagram that represents the different layers of a host operating system 200 operable on computer system 100 of FIG. 1 is shown. Host operating system 200 includes a network interface card driver 210 that operates NIC 118 and moves data packets between NIC 118 and other hardware and software of computer system 100. Implemented directly above network interface card driver 210 is a network device interface specification (NDIS) wrapper 220. Although such a driver is recited herein, the present invention is well suited to the use of various other drivers well known in the art. FIG. 2 further includes a schematic representation of operating system layers 230. NDIS wrapper 220 primarily arbitrates the control of network interface card driver 210 between various application programs, typically shown as 260.

GENERAL DESCRIPTION OF THE PRESENT INVENTION

Figure 3A:
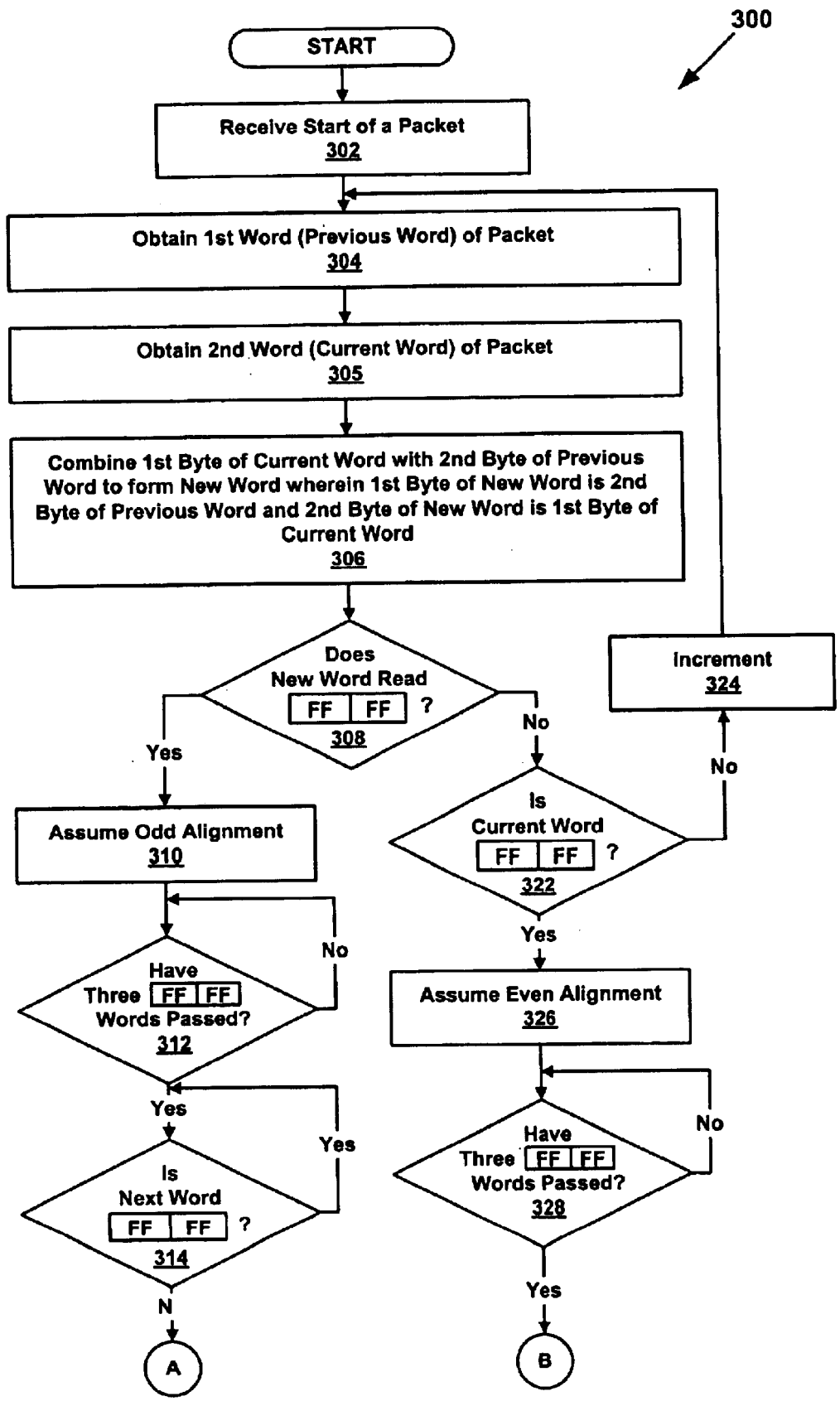
FIG. 3 is a flow chart of steps performed in one implementation of a method in accordance with one embodiment of the present claimed invention.
Figure 3B:
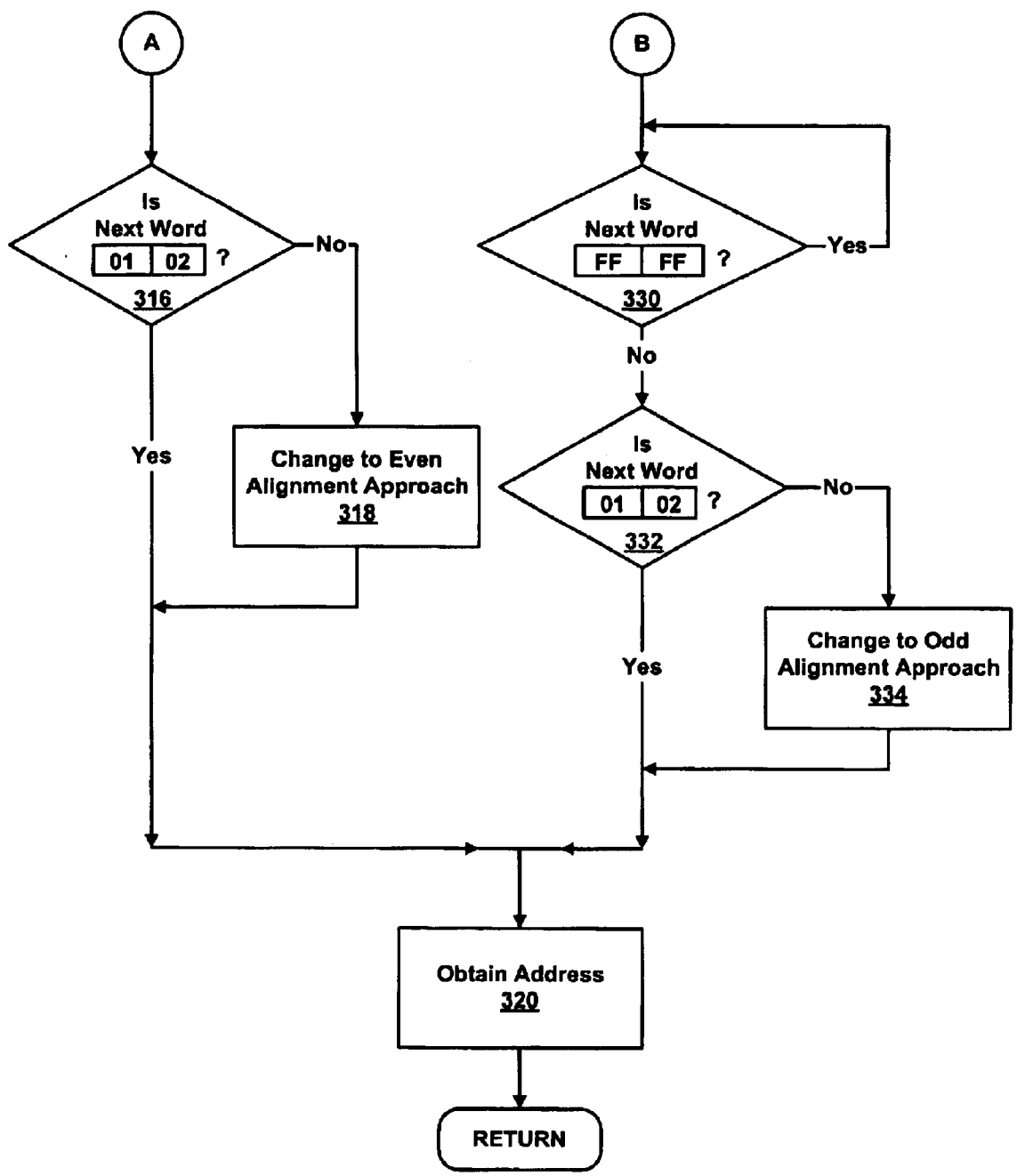

With reference next to FIG. 3, a flow chart 300 of exemplary steps used by the present invention is shown. Flow chart 300 includes processes of the present invention which, in one embodiment, performed by NIC 118 under the control of computer-readable and computer-executable instructions. The computer-readable and computer-executable instructions reside, for example, in data storage features such as computer usable volatile memory 106, computer usable non-volatile memory 108 of FIG. 1, and/or memory on NIC 118. The computer-readable and computer-executable instructions are used to control or operate in conjunction with, for example, central processing unit 104, ASIC 140 of NIC 118, host operating system 200, and network device driver 210. Although specific steps are disclosed in flow chart 300 of FIG. 3, such steps are exemplary. That is, the present invention is well suited to performing various other steps or variations of the steps recited in FIG. 3.

In step 302 of FIG. 3, in one embodiment, the present invention receives the start of a packet. Moreover, in the present embodiment, NIC 118 receives the start of an incoming streaming data packet. As an overview, and as will be discussed in the steps below in detail, the present embodiment will, in part, determine whether the incoming data packet is a Magic Packet® regardless of whether the streaming data packet has a first alignment or a second alignment. In the following description of embodiments of the present invention, the peripheral component driver is a network interface card driver. Additionally, in the following description of embodiments of the present invention, the peripheral component is a network interface card which is removably coupleable to the host computer. Although the present embodiments specifically recite a network interface card and a network interface card driver, the present invention is also well suited to an embodiment employing various other peripheral components and peripheral component drivers.

That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver. Additionally, the present invention is well suited to use in an embodiment in which the peripheral component is, for example, a rate controller, a small computer system interface (SCSI) controller, a graphics card, and the like. Furthermore, the present invention is also well suited to use in an embedded system, an ASIC, and the like.

Figure 4:
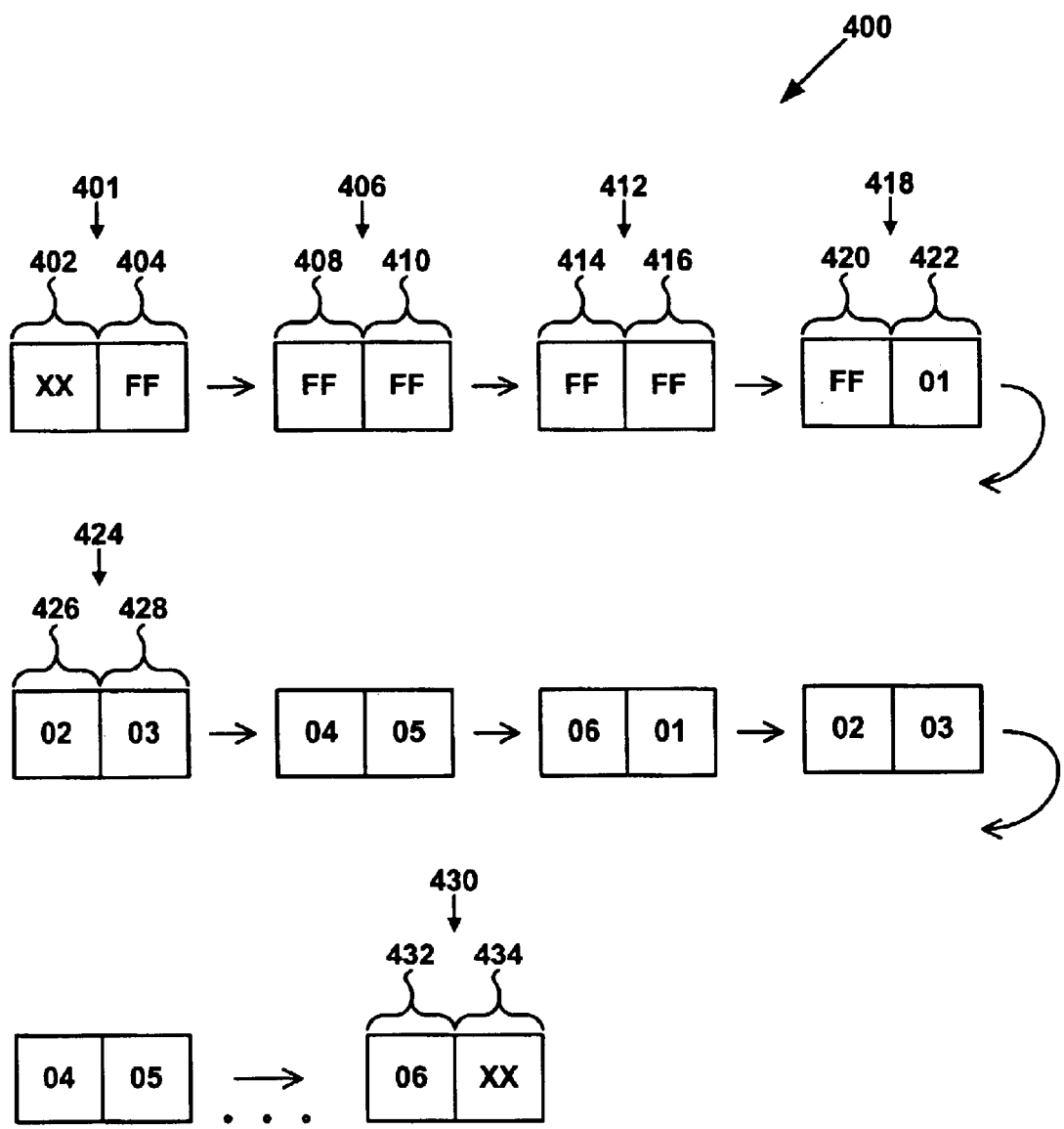
FIG. 4 is a physical representation of an incoming MAGIC PACKET® in accordance with one embodiment of the present claimed invention.

With reference still to step 302, in the present embodiment, a 16-bit wide bus environment is utilized. Thus, the following discussion will pertain to such an environment. The present invention is also well suited, however, to use in various other bus environments. For purposes of illustration, sample MAGIC PACKET® 400 received by NIC 118 is shown in FIG. 4. As shown in FIG. 4, first, a 16-bit word 401 is received wherein the first byte is miscellaneous data denoted as XX. The second byte of packet 401 is 8 bits of 1's denoted as FF. In the following discussion, FF refers to FFh which will be understood as the hexadecimal representation of 8 bits of 1's. Additionally, in the present embodiment, Magic Packet 400 will be received in 16-bit word packets. The next packet received by NIC 118 is packet 406. Both the first byte 408 and the second byte 410 of packet 406 are comprised of 8 bits of 1's denoted as FF. Similarly, the next packet received by NIC 118 is packet 412. Both the first byte 414 and the second byte 416 of packet 412 are comprised of 8 bits of 1's denoted as FF. Next, packet 418 is received by NIC 118. The first byte 420 of Packet 418 is comprised of 8 bits of 1's denoted as FF. The second byte 422 of Packet 418 is comprised of the first 8 bits denoted as 01 of the MAC (media access control) address for Magic Packet 400. Similarly, packet 424 is received by NIC 118. The first byte 426 of Packet 424 is comprised of the second 8 bits denoted as 02 of the MAC address for Magic Packet 400. The second byte 428 of Packet 424 is comprised of the third 8 bits denoted as 03 of the MAC address for MAGIC PACKET® 400. As shown in FIG. 4, the MAC address for MAGIC PACKET® 400 is 01 02 03 04 05 06. Hence, to conclude the required repetition of the MAC address 16 times, NIC 118 will receive packet 430 wherein the first byte 432 of Packet 430 is comprised of the sixth 8 bits denoted as 06 of the MAC address for MAGIC PACKET® 400, and the second byte 434 of Packet 430 is comprised of the miscellaneous data denoted as XX. For purposes of the present application, Magic Packet® 400 of FIG. 4 is deemed odd-aligned because the first occurrence of an FF byte occurs in the second byte 404 of packet 401. For purposes of the present application, a MAGIC PACKET® will be deemed even-aligned if the first occurrence of an FF byte occurs in the first byte of a packet.

With reference next to step 304 of FIG. 3, the present invention receives a first portion of an incoming packet stream at a peripheral component adapted to be coupled to a host computer. More particularly, the present embodiment receives 16 bit word 401 of MAGIC PACKET® 400 at NIC 118 which is coupled to host computer 100 of FIG. 1. For purposes of the present example, word 401 is referred to as the "previous word".

Next, at step 305 of FIG. 3, the present invention receives a second portion of an incoming packet stream at a peripheral component adapted to be coupled to a host computer. More particularly, the present embodiment receives 16 bit word 406 of MAGIC PACKET® 400 at NIC 118 which is coupled to host computer 100 of FIG. 1. For purposes of the present example, word 406 is referred to as the "current word".

Figure 5:
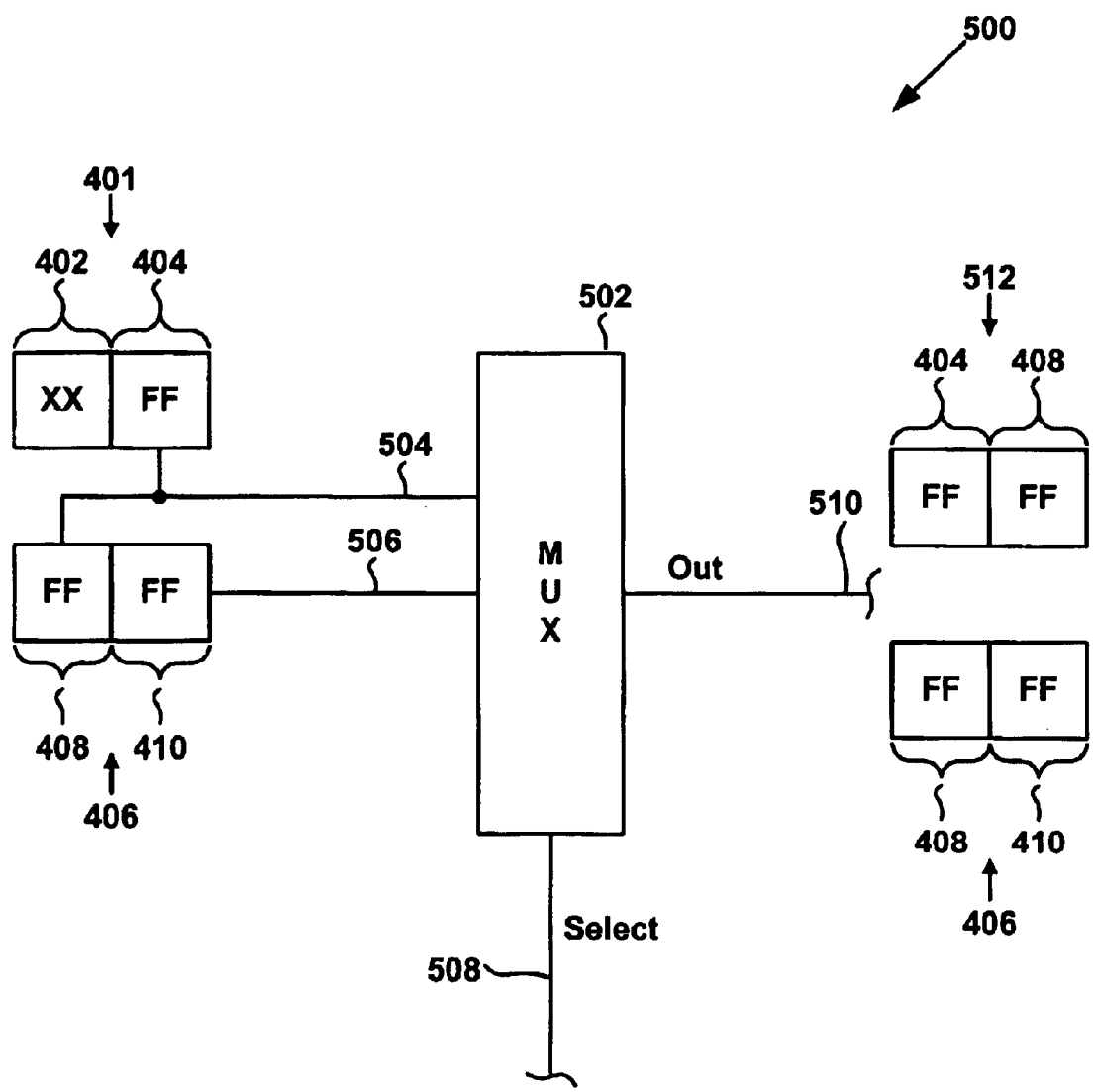
FIG. 5 is a representation illustrating the combining of previous word and a current word in order to form a new word in accordance with one embodiment of the present claimed invention.

At step 306, the present embodiment performs the first of many steps (all of which will be described in detail below) to determine whether MAGIC PACKET® 400 has a first alignment (e.g. even-alignment) or a second alignment (e.g. odd-alignment). Specifically, the present embodiment combines the first byte of the current word with the second byte of the previous word to form a new word. In the present embodiment, the first byte of the new word is the second byte of the previous word and the second byte of the new word is the first byte of the current word. Referring still to step 306, at a FIG. 5, a representation 500 illustrating the combining of previous word 401 and a current word 406 in order to form a new word 512 in accordance with one embodiment of the present claimed invention is shown. In step 306 of the present embodiment, a multiplexer 502 is used to create new word 512. In this embodiment, previous word 401 is stored in a first register, and current word 406 is stored in a second register. Both registers are coupled to multiplexer 502. At step 306 line 504 of multiplexer 502 is selected via select line 508. As shown in FIG. 5, line 504 multiplexes first byte 408 of current word 406 with second byte 404 of previous word 401 to form new word 512 which is then output on out line 510. As will be discussed below, the present embodiment will then increment the registers such that word 406 shifts to the previous register and word 412 of FIG. 4 moves to the current register. Such incrementing continues in a manner as will be described in detail below. For purposes of the present application, such multiplexing of the first byte of the current word with the second byte of previous word is used when the incoming packet stream is deemed to be odd-aligned. By using the above-described odd-alignment approach, data packets which when received were configured to be odd-aligned, are converted by the multiplexing process of step 306 to an even-aligned configuration.

Referring still to step 306 and FIG. 5, multiplexer 502 is further able to generate a different output. More specifically, as shown in FIG. 5, line 506 of multiplexer 502 is coupled to current word 406. Thus, when line 506 is selected via select line 508 current word 406 is then output on out line 510. As will be discussed below, the present embodiment will then increment the registers such that word 406 shifts to the previous register and word 412 of FIG. 4 moves to the current register. Such incrementing continues in a manner as will be described in detail below. For purposes of the present application, such an approach of forwarding the current word to out line 510 is used when the incoming packet stream is deemed to be even-aligned.

Figure 6:
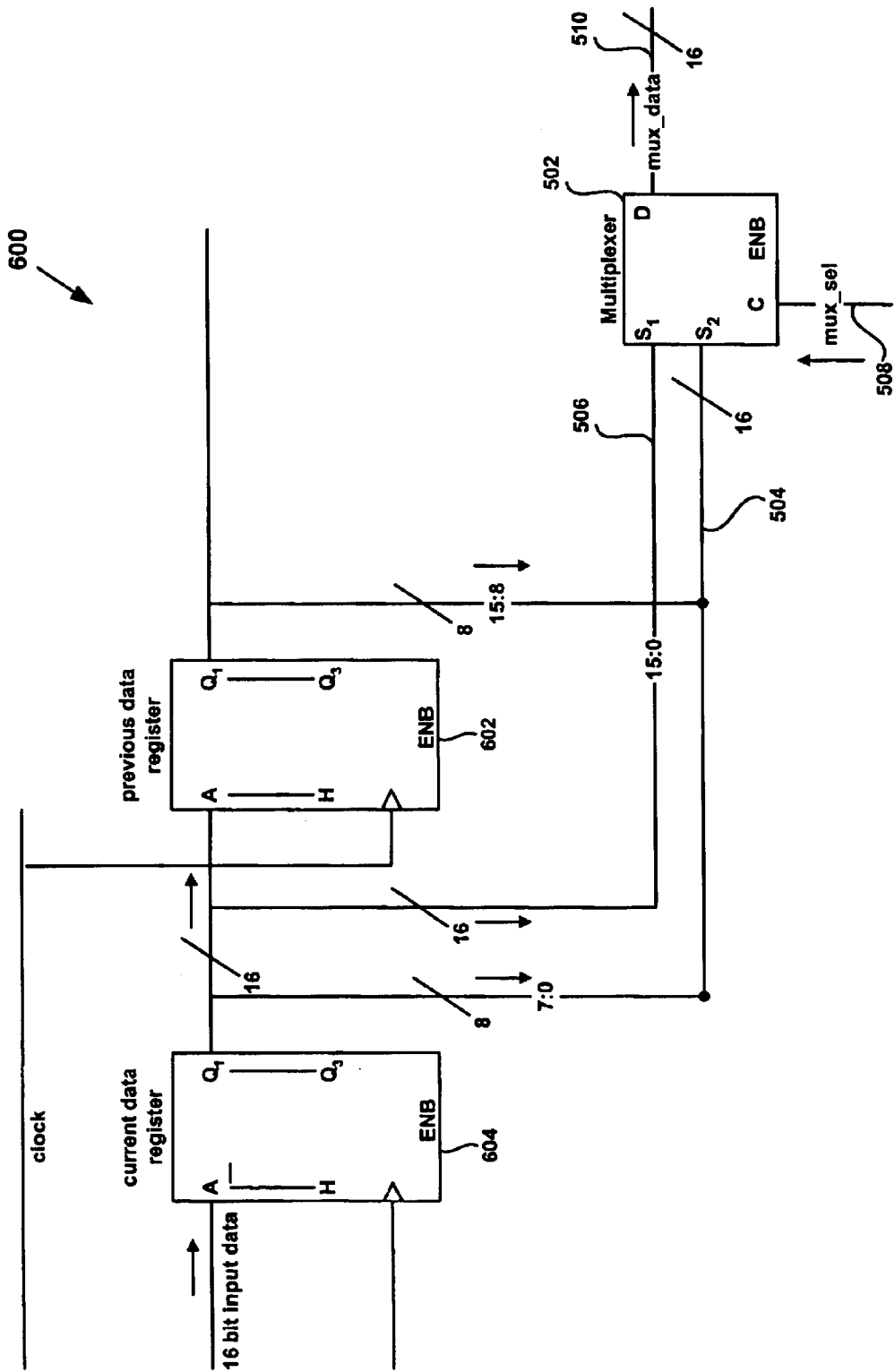
FIG. 6 is a schematic diagram of the components used to accomplish the combining of previous word and a current word in order to form a new word in accordance with one embodiment of the present claimed invention.

With reference next to FIG. 6, a schematic circuit diagram 600 of the components used to accomplish the combining of previous word and a current word in order to form a new word in accordance with one embodiment of the present claimed invention is shown. A first register 602 for storing the previous word, and a second register 604 for storing the current word are shown coupled to multiplexer 502 via lines 506 and 504. Select line 508 is used to select either the even-aligned approach (forwarding the current word to out line 510 via line 506), or the odd-aligned approach (multiplexing the first byte of the current word with the second byte of the previous word to form a new word via line 504 and forwarding the new word out line 510). In the present embodiment, multiplexer 502 is implemented in hardware residing, for example, in ASIC 140 of NIC 118. The present invention is well suited, however, to various other configurations and to having multiplexer 502 or the various other implementations disposed other than on ASIC 140 of NIC 118.

At step 308, after combining the first byte of the current word with the second byte of the previous word to form a new word (step 306), the present embodiment then determines whether the new word 512 is FFFF. If so, the present embodiment proceeds to step 310. If the new word is not FFFF, the present embodiment proceeds to step 322.

At step 310, the present embodiment assumes the incoming streaming data is odd-aligned because at step 308, after combining the first byte of the current word with the second byte of the previous word, the new word 512 was FFFF. That is, select line 508 selects the odd-alignment approach. As mentioned above, by employing the present embodiment, data packets which when received were configured to be odd-aligned, are converted by the multiplexing process of step 306 to an even-aligned configuration. As stated above, in the present embodiment, it is assumed that the incoming streaming data is odd-aligned if, at step 308 after combining the first byte of the current word with the second byte of the previous word, the new word 512 was FFFF. The present invention is also well suited to an approach in which it is assumed that the incoming streaming data is even-aligned when at step 308, after combining the first byte of the current word with the second byte of the previous word, the new word 512 was FFFF.

Next, at step 312, after the continuous incrementing in which: the word in current register 604 is shifted to previous register 602; the next received word is placed in current register 604; and the process of step 306 is performed; the present embodiment determines whether three words of FFFF have been received from out line 510 of multiplexer 502. If three words of FFFF have not been received from out line 510 of multiplexer 502, the present invention repeats step 312. If three words of FFFF have been received from out line 510 of multiplexer 502, the present invention proceeds to step 314.

At step 314, after having received three words of FFFF from out line 510 of multiplexer 502, the present embodiment determines whether the next word is FFFF. If the next word is FFFF, the present invention repeats step 314. If the next word is not FFFF, the present invention proceeds to step 316. In so doing, the present embodiment is able to efficiently handle an instance in which an incoming MAGIC PACKET® begins with more than six consecutive bytes of FFFF.

At step 316, the present embodiment, determines whether the next word is the first word of the MAC address of a PC to be awakened by the MAGIC PACKET®. In the present example, as shown in MAGIC PACKET® 400 of FIG. 4, the first word of the MAC address would be 0102. If the next word is the first word of the MAC address of a PC to be awakened by the MAGIC PACKET®, the present embodiment proceeds to step 320. If the next word is not the first word of the MAC address of a PC to be awakened by the MAGIC PACKET®, (e.g. the next word is FF01), the present embodiment proceeds to step 318.

At step 318, if at step 316 the next word was not the first word of the MAC address of a PC to be awakened by the MAGIC PACKET®; (e.g. the next word is FF01), the present embodiment changes the assumption made at step 310. That is, at step 310 an assumption was made that the incoming packet stream was odd-aligned. As a result, select line 508 of multiplexer 502 selects the odd-alignment approach wherein a new word is formed by combining the first byte of the current word with the second byte of the previous word. Hence, at step 318, the present embodiment changes to the even-alignment approach. That is, select line 508 of multiplexer 502 selects the even-alignment approach wherein the current word is passed through multiplexer 502 to out line 510. In so doing, the present embodiment selects the correct alignment (i.e. even-alignment) of the incoming packet and the present embodiment is able to efficiently derive the MAC address contained in MAGIC PACKET® 400.

Next, at step 320, the present embodiment obtains the MAC address of the MAGIC PACKET® 400. Hence, the present embodiment is able to efficiently handle an incoming packet stream using a single processing unit wherein the single processing unit is adapted to handle only packet streams having a first alignment. Thus, the present embodiment allows a single processing unit which is adapted to handle only packet streams having an even-alignment to handle an incoming packet stream even if the incoming packet stream is odd-aligned.

Referring now to step 322, as stated above, if at step 308, after combining the first byte of the current word with the second byte of the previous word to form a new word (step 306), the present embodiment determines that the new word 512 is not FFFF, the present embodiment proceeds to step 322. At step 322, the present embodiment determines whether the current word was FFFF. If the current word was not FFFF, the present embodiment then proceeds to step 324. If the current word was FFFF, the present embodiment proceeds to step 326.

At step 324, the present embodiment increments by shifting the word in current register 604 to previous register 602 and placing the next received word in current register 604. The present embodiment then repeats the aforementioned steps but the previous word is now, for example, word 406 and the current word is now, for example, word 412.

At step 326, the present embodiment assumes the incoming streaming data is even-aligned because at step 322, the current word was FFFF. That is, select line 508 selects the even-alignment approach.

Next, at step 328, after the continuous incrementing in which: the word in current register 604 is shifted to previous register 602; the next received word is placed in current register 604 and so on, the present embodiment determines whether three words of FFFF have been received from out line 510 of multiplexer 502 If three words of FFFF have not been received from out line 510 of multiplexer 502, the present invention repeats step 328. If three words of FFFF have been received from out line 510 of multiplexer 502, the present invention proceeds to step 330.

At step 330, after having received three words of FFFF from out line 510 of multiplexer 502, the present embodiment determines whether the next word is FFFF. If the next word is FFFF, the present invention repeats step 330. If the next word is not FFFF, the present invention proceeds to step 332. In so doing, the present embodiment is able to efficiently handle an instance in which an incoming MAGIC PACKET® begins with more than six consecutive bytes of FFFF.

At step 332, the present embodiment, determines whether the next word is the first word of the MAC address of a PC to be awakened by the MAGIC PACKET®. In the present example, as shown in MAGIC PACKET® 400 of FIG. 4, the first word of the MAC address would be 0102. If the next word is the first word of the MAC address of a PC to be awakened by the MAGIC PACKET®, the present embodiment proceeds to step 320. If the next word is not the first word of the MAC address of a PC to be awakened by the MAGIC PACKET®, (e.g. the next word is FF01), the present embodiment proceeds to step 334.

At step 334, if at step 332 the next word was not the first word of the MAC address of a PC to be awakened by the MAGIC PACKET®, (e.g. the next word is FF01), the present embodiment changes the assumption made at step 326. That is, at step 326 an assumption was made that the incoming packet stream was even-aligned. As a result, select line 508 of multiplexer 502 selects the even-alignment approach wherein the current word is passed through multiplexer 502. Hence, at step 334, the present embodiment changes to the odd-alignment approach. That is, select line 508 of multiplexer 502 selects the odd-alignment approach wherein a new word is formed by combining the first byte of the current word with the second byte of the previous word. In so doing, the present embodiment selects the correct alignment (i.e. odd-alignment) of the incoming packet and the present embodiment is able to efficiently derive the MAC address contained in MAGIC PACKET® 400.

Next, at step 320, the present embodiment obtains the MAC address of the MAGIC PACKET® 400. Hence, the present embodiment is able to efficiently handle an incoming packet stream using a single processing unit wherein the single processing unit is adapted to handle only packet streams having a first alignment. Thus, the present embodiment allows a single processing unit which is adapted to handle only packet streams having an even-alignment to handle an incoming packet stream even if the incoming packet stream is odd-aligned.

Thus, the present invention provides a system and method which efficiently handles a particular streaming data packet regardless of whether the streaming data packet has a first alignment or a second alignment. The present invention further provides a system and method achieves the above-listed accomplishment and wherein the method and system is able to handle the streaming data packet using only a single processing unit regardless of whether the streaming data packet has a first alignment or a second alignment.

Following is an example of computer code used in conjunction with one embodiment of the present invention.

```
/* Description : This state machine looks for a magic packet pattern */
/* within a received packet. If a magic packet is found signal       */
/* rg_magic_pkt_rclk is asserted until rg_rx_preamble_rdy is         */
/* asserted.                                                          */
/*                                                                    */
/*                                                                    */
/****************************************************************/
    module rgmMagicPktSM
    (
    rclk,
    rg_reset,
    gm_mac_sop_rclk,
    gm_rx_data_mac_rclk,
    rg_rx_preamble_rdy,
    rg_magic_pkt_rclk,
    mac_address_reg,
    mac_address_mask_reg,
    rg_MagicPktSM_debug_bus
    );
/************* inputs *************/
    input         rclk,
                  rg_reset;
    input  [15:0] gm_rx_data_mac_rclk;
    input  [47:0] mac_address_reg,
                  mac_address_mask_reg;
    input         rg_rx_preamble_rdy;
    input         gm_mac_sop_rclk;
/************* outputs *************/
    output        rg_magic_pkt_rclk;
    output [12:0] rg_MagicPktSM_debug_bus;
/************* registers *************/
    reg           rg_magic_pkt_rclk,
                  rg_magic_pkt;
    reg    [15:0] rg_mac_data_prev;
    reg    [15:0] rg_mac_data_mux;
    reg           rg_mac_data_mux_sel,
                  rg_mac_data_mux_sel_rclk;
    reg    [2:0]  current_state,
                  next_state;
    reg    [15:0] mac_addr_word0,
                  mac_addr_word1,
    mac_addr_word2;
    reg    [15:0] even_mac_addr_word0;
    reg           mac_addr_word0_match,
                  mac_addr_word1_match,
                  mac_addr_word2_match;
    reg           even_mac_addr_word0_match;
    reg    [4:0]  addr_count;
    reg           addr_reset,
                  addr_inc;
    reg           rg_odd_is_ff,
                  rg_curr_is_ff,
                  rg_data_mux_is_ff;
/************* wires *************/
    wire   [12:0] rg_MagicPktSM_debug_bus;
    wire   [15:0] rg_mac_data_curr;
    wire   [15:0] rg_mac data_odd;
    assign        rg_mac_data_odd =
                  {gm_rx_data_mac_rclk[7:0],
                                rg_mac_data_prev[15:8]};
    assign        rg_mac_data_curr = gm_rx_data_mac_rclk;
    assign        rg_MagicPktSM_debug_bus = {
                                current_state,
                                next_state,
                                rg_mac_data_mux_sel_rclk,
                                mac_addr_word0_match,
                                mac_addr_word1_match,
                                mac_addr_word2_match,
                                rg_magic_pkt_rclk,
                                addr_reset,
                                addr_inc
                                };
    parameter [2:0]
        IDLE            = 3'b111,
        GOT_SOP         = 3'b000,
        SYNC_0          = 3'b001,
        SYNC_1          = 3'b010,
        ADDR_WORD0              = 3'b011,
        ADDR_WORD1              = 3'b100,
        ADDR_WORD2              = 3'b101,
        MAGIC_PKT               = 3'b110;
// synopsys sync_set_reset "rg_reset"
// Registers output signal rg_magic_pkt_rclk
always @(posedge rclk)
  begin: rgm_magic_pkt_reg_seq
    if (rg_reset)
      begin
        rg_magic_pkt_rclk <= 0;
      end
    else
      begin
        rg_magic_pkt_rclk <= rg_magic_pkt;
      end
  end
// Pipeline of gm_rx_data_mac_rclk
always @(posedge rclk)
  begin: rgm_gm_rx_data_pipeline_seq
    if (rg_reset)
      begin
```

```
                rg_mac_data_prev <= 16'h0000;
            end
        else
            begin
                rg_mac_data_prev <= rg_mac_data_curr;
            end
    end
// Mux used by the state machine to either compare the current word
// from the GMAC or {rg_mac_data_prev[15:8],
gm_rx_data_mac_rclk[7:0]}
always @(rg_mac_data_curr or rg_mac_data_odd or
        rg_mac_data_mux_sel_rclk)
    begin: rgm_mac_mux_comb
        if (~rg_mac_data_mux_sel_rclk)
            begin
                rg_mac_data_mux = rg_mac_data_curr;
            end
        else
            begin
                rg_mac_data_mux = rg_mac_data odd;
            end
    end
// Registers the current mux selection
always @(posedge rclk)
    begin: rgm_mac_mux_sel_seq
        if (rg_reset)
            begin
                rg_mac_data_mux_sel_rclk <= 0;
            end
        else
            begin
                rg_mac_data_mux_sel_rclk <=
                rg_mac_data_mux_sel;
            end
    end
// Seq block that sets current state to next state
always @(posedge rclk)
    begin: rgm_magic_pkt_sm_seq
        if (rg_reset)
            begin
                current_state <= IDLE;
            end
        else
            begin
                current_state <= next_state;
            end
    end
// Comb block for SM
always @(current_state or
        rg_mac_data_mux_sel_rclk or
        mac_addr_word0_match or
        mac_addr_word1_match or
        mac_addr_word2_match or
        even_mac_addr_word0_match or
        rg_magic_pkt_rclk    or
        rg_rx_preamble_rdy   or
        gm_mac_sop_rclk      or
        rg_odd_is_ff    or
        rg_curr_is_ff   or
        rg_data_mux_is_ff    or
        rg_mac_data_mux_sel_rclk or
        addr_count)
    begin
        rg_mac_data_mux_sel = rg_mac_data_mux_sel_rclk;
        next_state = current_state;
        addr_reset = 0;
        addr_inc = 0;
        rg_magic_pkt = rg_magic_pkt_rclk;
        // When rg_preamble_rdy is set, then rgmPreamble is done
        // with rg_magic_pkt_rclk, so we reset it here.
        if (rg_rx_preamble_rdy)
            begin
                rg_magic_pkt = 0;
            end
        case (current_state)
            // We sit around here looking for the beginning of a magic
            // pkt sequence. There are basically two cases here.
            // case 1: pattern is on even byte boundary
            // case 2: pattern is on odd byte boundary
            // If case two occurs, then we set the
            // rg_mac_data_mux_sel so the rest
            // of the SM will look at the correct data bytes.
            IDLE:
                begin
                    rg_mac_data_mux_sel = 0;
                    if (gm_mac_sop_rclk)
                        begin
                            addr_reset = 1;
                            if (rg_odd_is_ff)
                                begin
                                    rg_mac_data_mux_sel = 1;
                                    next_state = SYNC_0;
                                end
                            else if (rg_curr_is_ff)
                                begin
                                    rg_mac_data_mux_sel = 0;
                                    next_state = SYNC_0;
                                end
                            else
                                begin
                                    next_state = GOT_SOP;
                                end
                        end
                end
            // This is a soft of special idle state that we go to when
            // we are within a packet. It is basically the same as IDLE
            // except that this state doesn't rely on gm_mac_sop_rclk
            GOT_SOP:
                begin
                    addr_reset = 1;
                    if (rg_rx_preamble_rdy)
                        begin
                            next_state = IDLE;
                        end
                    else if (rg_odd_is_ff)
                        begin
                            rg_mac_data_mux_sel = 1;
                            next_state = SYNC_0;
                        end
                    else if (rg_curr_is_ff)
                        begin
                            rg_mac_data_mux_sel = 0;
                            next_state = SYNC_0;
                        end
                end
            // Look for next word in magic pkt sequence.
            // If we find it, we move on. Otherwise we bail
            // back to the IDLE state.
            SYNC_0:
                begin
                    if (rg_rx_preamble_rdy)
                        begin
                            next_state = IDLE;
                        end
                    else if (rg_data_mux_is_ff)
                        begin
                            next_state = SYNC_1;
                        end
                    else
                        begin
                            next_state = GOT_SOP;
                        end
                end
            SYNC_1:
                begin
                    if (rg_rx_preamble_rdy)
                        begin
                            next_state = IDLE;
                        end
                    else if (rg_data_mux_is_ff)
                        begin
                            next_state = ADDR_WORD0;
                        end
                    else
                        begin
                            next_state = GOT_SOP;
                        end
                end
```

```
            // Check for an address match. If the address matches we
            // move on to the next state. Otherwise we check if we are
            // still looking at the sync pattern of a magic pkt, and if
            // so we set the mux and stay in the current state.
            // If we are looking at a new magic pkt sync pattern we
            // go to the SYNC_0 state.
            // Otherwise we go to the GOT_SOP state.
            ADDR_WORD0:
                begin
                    if (rg_rx_preamble_rdy)
                        begin
                            next_state = IDLE;
                        end
                    else if (mac_addr_word0_match)
                        begin
                            next_state = ADDR_WORD1;
                        end
                    else if (even_mac_addr_word0_match &
                        rg_mac_data_mux_sel_rclk)
                        begin
                            rg_mac_data_mux_sel = 0;
                            next_state = ADDR_WORD1;
                        end
                    else if (rg_odd_is_ff)
                begin
                        rg_mac_data_mux_sel = 1;
                        if (addr_count != 0)
                            begin
                                addr_reset = 1;
                                next_state = SYNC_0;
                            end
                        end
                    else if (rg_curr_is_ff)
                        begin
                            rg_mac_data_mux_sel = 0;
                            if (addr_count != 0)
                                begin
                            addr_reset = 1;
                            next_state = SYNC_0;
                                end
                        end
                end
            else
                begin
                    next_state = GOT_SOP;
                end
            // Special case here. If we get here 16 times then we have
            // found a magic pkt. Next state is MAGIC_PKT.
            if (addr_count == 16)
                begin
                    rg_magic_pkt  = 1;
                    next_state    = MAGIC_PKT;
                end
            end
// The next two states are similar to the state above.
ADDR_WORD1:
    begin
        if (rg_rx_preamble_rdy)
            begin
                next_state = IDLE;
            end
        else if (mac_addr_word1_match)
            begin
                next_state = ADDR_WORD2;
            end
        else if (rg_odd_is_ff)
            begin
                addr_reset = 1;
                rg_mac_data_mux_sel = 1;
                next_state = SYNC_0;
            end
        else if (rg_curr_is_ff)
            begin
                addr_reset = 1;
                rg_mac_data_mux_sel = 0;
                next_state = SYNC_0;
            end
        else
            begin
                next_state = GOT_SOP;
            end
        end
ADDR_WORD2:
    begin
        if (rg_rx_preamble_rdy)
            begin
                next_state = IDLE;
            end
        else if (mac_addr_word2_match)
            begin
                next_state = ADDR_WORD0;
                addr_inc = 1;
            end
        else if (rg_odd_is_ff)
            begin
                addr_reset = 1;
                rg_mac_data_mux_sel = 1;
                next_state = SYNC_0;
            end
        else if (rg_curr_is_ff)
            begin
                addr_reset = 1;
                rg_mac_data_mux_sel = 0;
                next_state = SYNC_0;
            end
        else
            begin
                next_state = GOT_SOP;
            end
        end
    // We sit around in here until we see rg_preamble_rdy;
    MAGIC_PKT:
        begin
            if (rg_rx_preamble_rdy)
                begin
                    next_state = IDLE;
                end
            end
        endcase
    end
// Here we apply mac_address_mask_reg to the incoming data from the
// GMAC.
always @(rg_mac_data_mux or mac_address_mask_reg)
    begin
        mac_addr_word0[7:0] = ~mac_address_mask_reg[47:40] &
                        rg_mac_data_mux[7:0];
        mac_addr_word0[15:8] = ~mac_address_mask_reg[39:32] &
                        rg_mac_data_mux[15:8];
        mac_addr_word1[7:0] = ~mac_address_mask_reg[31:24] &
                        rg_mac_data_mux[7:0];
        mac_addr_word1[15:8] = ~mac_address_mask_reg[23:16] &
                        rg_mac_data_mux[15:8];
        mac_addr_word2[7:0] = ~mac_address_mask_reg[15:8] &
                        rg_mac_data_mux[7:0];
        mac_addr_word2[15:8] = ~mac_address_mask_reg[7:0] &
                        rg_mac_data_mux[15:8];
    end
always @(rg_mac_data_curr or mac_address_mask_reg)
    begin
        even_mac_addr_word0[7:0] =
            ~mac_address_mask_reg[47:40] &
                        rg_mac_data_curr[7:0];
        even_mac_addr_word0[15:8] =
            ~mac_address_mask_reg[39:32] &
                        rg_mac_data_curr[15:8];
    end
// Here we take the results from above and see if they match with
// the station address, generating 3 match bits. The state
// machine will know which bit to check for depending on current_state.
always @(mac_addr_word0 or mac_addr_word1 or
        mac_addr_word2 or
            even_mac_addr_word0 or
            mac_address_reg)
    begin
        mac_addr_word0_match = 0;
        mac_addr_word1_match = 0;
        mac_addr_word2_match = 0;
        even_mac_addr_word0_match = 0;
        if ((mac_addr_word0[7:0] == mac_address_reg[47:40]) &&
```

-continued

```
        mac_addr_word0[15:8] == mac_address_reg[39:32])
      begin
        mac_addr_word0_match = 1;
      end
    if ((even_mac_addr_word0[7:0] ==
      mac_address_reg[47:40]) &&
        even_mac_addr_word0[15:8] == mac_address_reg[39:32])
      begin
        even_mac_addr_word0_match = 1;
      end
    if ((mac_addr_word1[7:0] == mac_address_reg[31:24]) &&
        mac_addr_word1[15:8] == mac_address_reg[23:16])
      begin
        mac_addr_word1_match = 1;
      end
    if ((mac_addr_word2[7:0] == mac_address_reg[15:8]) &&
        mac_addr_word2[15:8] == mac_address_reg[7:0])
      begin
        mac_addr_word2_match = 1;
      end
  end
always @(rg_mac_data_odd or rg_mac_data_curr)
  begin
    if (rg_mac_data_odd == 16'hffff)
      begin
        rg_odd_is_ff = 1;
      end
    else
      begin
        rg_odd_is_ff = 0;
      end
    if (rg_mac_data_curr == 16'hffff)
      begin
        rg_curr_is_ff = 1;
      end
    else
      begin
        rg_curr_is_ff = 0;
      end
  end
always @(rg_mac_data_mux)
  begin
    if (rg_mac_data_mux == 16'hffff)
      begin
        rg_data_mux_is_ff = 1;
      end
    else
      begin
        rg_data_mux_is_ff = 0;
      end
  end
// Counter to keep track of how many instances of our mac address
// we have found.
always @(posedge rclk)
  begin
    if (rg_reset)
      begin
        addr_count <= 0;
      end
    else if (addr_reset)
      begin
        addr_count <= 0;
      end
    else if (addr_inc)
      begin
        addr_count <= addr_count + 1;
      end
    else
      begin
        addr_count <= addr_count;
      end
  end
endmodule
```

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

What is claimed is:

1. A computer implemented method for efficiently handling a particular streaming data packet regardless of whether said streaming data packet has a first alignment or a second alignment, said method comprising the steps of:
   a) receiving a first portion of an incoming packet stream at a peripheral component adapted to be coupled to a host computer;
   b) receiving a second portion of said incoming packet stream at said peripheral component;
   c) determining whether said incoming packet stream has a first alignment or a second alignment;
   d) provided said incoming packet stream has said second alignment, reconfiguring said incoming packet stream to have said first alignment by changing the order of bytes of words received in said incoming packet stream; and
   e) handling said incoming packet stream using a single processing unit adapted to handle only packet streams having said first alignment.

2. The computer implemented method for efficiently handling a particular streaming data packet regardless of whether said streaming data packet has a first alignment or a second alignment as recited in claim 1 wherein said particular data streaming packet is a Magic Packet.

3. The computer implemented method for efficiently handling a particular streaming data packet regardless of whether said streaming data packet has a first alignment or second alignment as recited in claim 1 wherein said peripheral component is a network interface card.

4. The computer implemented method for efficiently handling a particular streaming data packet regardless of whether said streaming data packet has a first alignment or a second alignment as recited in claim 1 wherein said first portion of said packet stream is a first 16 bit word of said packet stream and said second portion of said packet stream is a second 16 bit word of said packet stream.

5. The computer implemented method for efficiently handling a particular streaming data packet regardless of whether said streaming data packet has a first alignment or a second alignment as recited in claim 1 wherein said first alignment is even-alignment.

6. The computer implemented method for efficiently handling a particular streaming data packet regardless of whether said streaming data packet has a first alignment or a second alignment as recited in claim 5 wherein said second alignment is odd-alignment.

7. The computer implemented method for efficiently handling a particular streaming data packet regardless of whether said streaming data packet has a first alignment or a second alignment as recited in claim 6 wherein step c) comprises the steps of:
   i) combining a first byte of said second 16 bit word with a second byte of said first 16 bit word to form a new 16 bit word wherein a first byte of said new 16 bit word is said second byte of said first 16 bit word, and wherein a second byte of said new 16 bit word is said first byte of said second 16 bit word; and ii) provided said new 16 bit word is FFFFh, assuming said packet stream has an odd-alignment; and iii) provided said new 16 bit word is not FFFFh, and provided said second 16 bit word is FFFFh, assuming said packet stream has an even-alignment.

8. The computer implemented method for efficiently handling a particular streaming data packet regardless of whether said streaming data packet has a first alignment or a second alignment as recited in claim 7 wherein step c) further comprises the steps of:

iv) provided said assumption at step ii) is incorrect, assuming said packet stream has an even-alignment; and v) provided said assumption at step iii) is incorrect, assuming said packet stream has an odd-alignment.

9. A computer system comprising:

a processor;

an address/data bus coupled to said processor;

a computer readable memory coupled to communicate with said processor, said processor for performing a method of efficiently handling a particular streaming data packet regardless of whether said streaming data packet has a first alignment or a second alignment, said method comprising the steps of:

a) receiving a first portion of an incoming packet stream at a peripheral component adapted be coupled to a host computer;

b) receiving a second portion of said incoming packet stream at said peripheral component;

c) determining whether said incoming packet stream has a first alignment or a second alignment;

d) provided said incoming packet stream has said second alignment, reconfiguring said incoming packet stream to have said first alignment by changing the order of bytes of words received in said incoming packet stream; and e) handling said incoming packet stream using a single processing unit adapted to handle only packet streams having said first alignment.

10. The computer system as recited in claim 9 wherein said particular data streaming packet is a Magic Packet.

11. The computer system of claim 9 wherein said peripheral component is a network interface card.

12. The computer system of claim 9 wherein said first portion of said packet stream is a first 16 bit word of said packet stream and said second portion of said packet stream is a second 16 bit word of said packet stream.

13. The computer system of claim 9 wherein said first alignment is even-alignment.

14. The computer system of claim 13 wherein said second alignment is odd-alignment.

15. The computer system of claim 14 wherein step c) comprises the steps of:

i) combining a first byte of said second 16 bit word with a second byte of said first 16 bit word to form anew 16 bit word wherein a first byte of said new 16 bit word is said second byte of said first 16 bit word, and wherein a second byte of said new 16 bit word is said first byte of said second 16 bit word; and ii) provided said new 16 bit word is FFFFh, assuming said packet stream has an odd-alignment; and iii) provided said new 16 bit word is not FFFFh, and provided said second 16 bit word is FFFFh, assuming said packet stream has an even-alignment.

16. The computer system of claim 15 wherein step c) further comprises the steps of:

iv) provided said assumption at step ii) is incorrect, assuming said packet stream has an even-alignment; and v) provided said assumption at step iii) is incorrect, assuming said packet stream has an odd-alignment.

17. A computer readable medium having computer readable program code embodied therein for causing a computer system to perform the steps of:

a) receiving a first portion of an incoming packet stream at a peripheral component adapted to be coupled to a host computer;

b) receiving a second portion of said incoming packet stream at said peripheral component;

c) determining whether said incoming packet stream has a first alignment or a second alignment;

d) provided said incoming packet stream has said second alignment, reconfiguring said incoming packet stream to have said first alignment by changing the order of bytes of words received in said incoming packet stream; and e) handling said incoming packet stream using a single processing unit adapted to handle only packet streams having said first alignment.

18. The computer readable medium as described in claim 17 wherein said computer-readable program code embodied therein causes said computer system to perform steps a) through e) wherein said a particular data streaming packet is a Magic Packet.

19. The computer readable medium as described in claim 17 wherein said computer-readable program code embodied therein causes said computer system to perform steps a) through e) wherein said peripheral component is a network interface card.

20. The computer readable medium as described in claim 17 wherein said computer-readable program code embodied therein causes said computer system to perform steps a) through e) wherein said first portion of said packet stream is a first 16 bit word of said packet stream and said second portion of said packet stream is a second 16 bit word of said packet stream.

21. The computer readable medium as described claim 17 wherein said computer-readable program code embodied therein causes said computer system to perform steps a) through e) wherein said first alignment is even-alignment.

22. The computer readable medium as described in claim 21 wherein said computer-readable program code embodied therein causes said computer system to perform steps a) through e) wherein said second alignment is odd-alignment.

23. The computer readable medium as described in claim 22 wherein said computer-readable program code embodied therein causes said computer system to perform step c) wherein step c) comprises the steps of:

i) i) combining a first byte of said second 16 bit word with a second byte of said first 16 bit word to form a new 16 bit word wherein a first byte of said new 16 bit word is said second byte of said first 16 bit word, and wherein a second byte of said new 16 bit word is said first byte of said second 16 bit word; and ii) provided said new 16 bit word is FFFFh, assuming said packet stream has an odd-alignment; and iii) provided said new 16 bit word is not FFFFh, and provided said second 16 bit word is FFFFh, assuming said packet stream has an even-alignment.

24. The computer readable medium as described in claim 23 wherein said computer-readable program code embodied therein causes said computer system to perform step c) wherein step c) further comprises the steps of:

iv) provided said assumption at step ii) is incorrect, assuming said packet stream has an even-alignment; and v) provided said assumption at step iii) is incorrect, ming said packet stream has an odd-alignment.

\* \* \* \* \*